(12) United States Patent
Balakrishnan (10) Patent No.: US 7,379,460 B2
(45) Date of Patent: May 27, 2008

(54) PACKET PROCESSING SYSTEM

(75) Inventor: Vinod K. Balakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1055 days.

(21) Appl. No.: 10/456,460

(22) Filed: Jun. 6, 2003

(65) Prior Publication Data

US 2004/0246980 A1 Dec. 9, 2004

(51) Int. Cl.
*H04L 12/28* (2006.01)
*H04L 12/56* (2006.01)
*G06F 3/00* (2006.01)
*G06F 9/44* (2006.01)
*G06F 13/00* (2006.01)
*G06F 9/46* (2006.01)

(52) U.S. Cl. .................. 370/392; 719/313; 718/100

(58) Field of Classification Search ............... 370/392, 370/412; 718/1, 100; 719/313
See application file for complete search history.

(56) References Cited

U.S. PATENT DOCUMENTS

2003/0163589 A1* 8/2003 Bunce et al. ............... 709/250

2006/0200825 A1* 9/2006 Potter, Jr. ................... 718/100

OTHER PUBLICATIONS

Adiletta, Matthew et al., "The Next Generation of Intel IXP Network Processors", Intel Technology Journal, vol. 6, Issue 3 (2002); © Intel Corporation. p. 6-18.
Adiletta, Matthew et al., "Packet over SONET: Achieving 10 Gigabit/sec Packet Processing with an IXP2800", Intel Technology Journal, vol. 6, Issue 3 (2002); © Intel Corporation. p. 29-39.
Feghali, Wajdi et al., "Security: Adding Protection to the Network via the Network Processor", Intel Technology Journal, vol. 6, Issue 3 (2002); © Intel Corporation. p. 40-49.
Intel White Paper, "Intel® IXP2400 Network Processor: Flexible, High-Performance Solution for Access and Edge Applications". 10pgs.

* cited by examiner

*Primary Examiner*—Kevin C. Harper
(74) *Attorney, Agent, or Firm*—Buckley, Maschoff & Talwalkar LLC (57) ABSTRACT

Some embodiments relate to a processor to provide a plurality of execution threads, a local memory associated with the processor, and a content-addressable memory associated with the processor. An execution thread of the processor may determine an ordering queue, associate a current thread with a last position in the ordering queue, receive a queue release signal from a previous thread in the ordering queue, and execute a critical code segment associated with the ordering queue.

25 Claims, 8 Drawing Sheets

| QUEUE ID | LAST THREAD ID |
|---|---|
| 1010101 | 2 |
| 2020201 | 4 |
| 1010102 | 6 |
| | |
| | |
| | |
| | |
| | |

| THREAD ID | NEXT THREAD ID |
|---|---|
| 0 | 1 |
| 1 | 2 |
| 2 | 8 |
| 3 | 4 |
| 4 | 8 |
| 5 | 6 |
| 6 | 8 |
| 7 | 8 |

PACKET PROCESSING SYSTEM

BACKGROUND

Conventional communication networks allow network devices to exchange messages with one another. A message may be transmitted in the form of multiple packets, each of which includes data and header information. Network devices process the header information in order to route the packets to their destination and to properly reassemble the message.

A network device may receive multiple packets of multiple messages. Multi-threaded processors are currently used by some network devices to process such packets. According to conventional processing, one or more threads of a multi-threaded processor process a first-received packet and one or more threads of the processor then process a next-received packet. This arrangement is intended to ensure that a first packet of a message is processed before a second packet of the message is processed.

DETAILED DESCRIPTION

Figure 1:
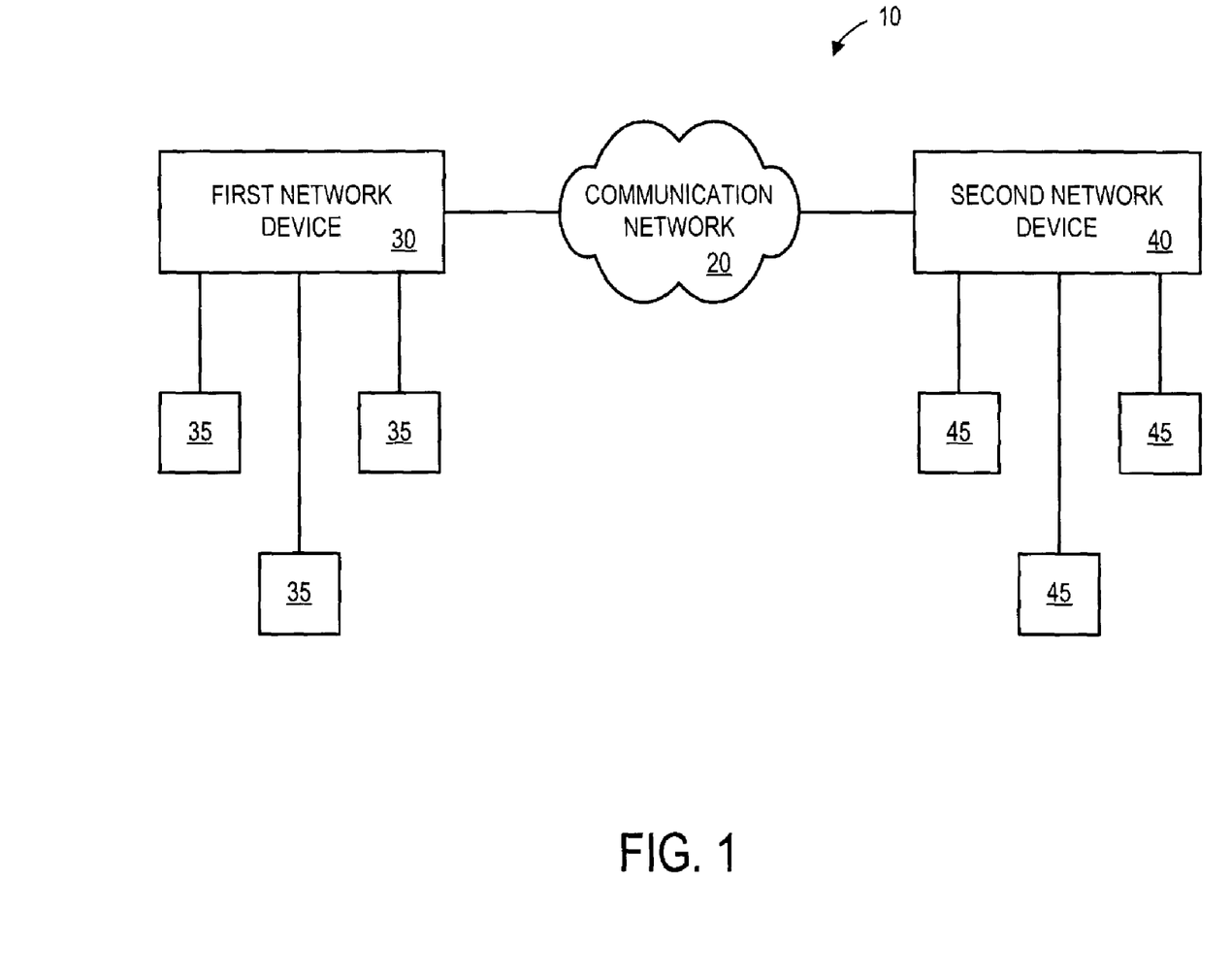
FIG. 1 is a block diagram of a network according to some embodiments.

FIG. 1 is a block diagram of communication system 10. Communication system 10 includes communication network 20, which is in communication with first network device 30 and second network device 40. In particular, first network device 30 may exchange information with second network device 40 via communication network 20. Network devices 30 and 40 may comprise, for example, network switches or routers, such a device incorporating one or more IXP2400 network processors available from Intel®. A network switch or router may receive streams of data packets from other network devices, such as personal computers and handheld devices, process the packets, and forward the packets to appropriate other network devices, including other network switches or routers. The packets may be received and forwarded by several network devices until they reach an appropriate destination.

Communication network 20 may comprise one or more network types, including but not limited to a Local Area Network (LAN), a Metropolitan Area Network (MAN), a Wide Area Network (WAN), a Fast Ethernet network, a wireless network, a fiber network, and/or an Internet Protocol (IP) network, such as the Internet, an intranet, or an extranet. Communication network 20 may support Layer 2 protocols, such as Ethernet or Packet-Over SONET, in which data is transmitted in packet form. Moreover, communication network 20 may comprise one or more of any readable medium for transferring data, including coaxial cable, twisted-pair wires, fiber-optics, RF, infrared and the like. Communication network 20 may include any number of unshown network devices (e.g., intermediate switches and routers).

As illustrated in FIG. 1, first network device 30 may communicate with a number of associated network devices 35. Each of network devices 35 may comprise any device for communicating via network packets, including a personal computer, a personal digital assistant, a cellular telephone, or the like. Similarly, second network device 40 may communicate with a number of associated devices 45. One of devices 35 may thereby transmit a message comprised of network packets to one of devices 45. The network packets may be encapsulated and transmitted according to any network protocol according to some embodiments.

Figure 2:
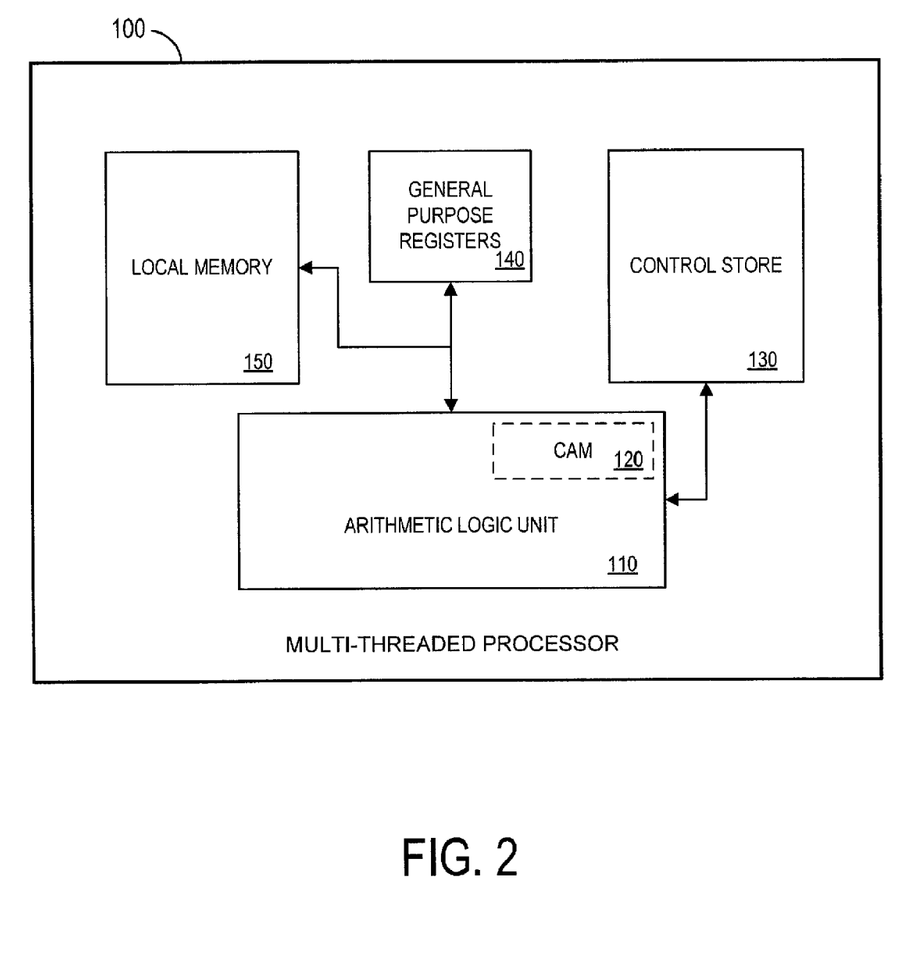
FIG. 2 is a block diagram of a multi-threaded processor according to some embodiments.

FIG. 2 is a block diagram of multi-threaded processor 100 according to some embodiments. Multi-threaded processor 100 may comprise a microengine of the aforementioned IXP 2400 processor. Processor 100 may provide multiple non-preemptible execution threads for executing software code segments.

Processor 100 includes arithmetic logic unit (ALU) 110 for executing software code segments. In some embodiments, ALU 110 supports up to eight threads of execution. ALU 110 comprises content-addressable memory (CAM) 120, which may include sixteen entries each comprising a 32-bit value. In some embodiments, CAM 120 stores a last thread table that identifies one or more threads occupying last positions in one or more ordering queues. The last thread table may also be used to determine if a particular ordering queue includes any threads.

CAM 120 allows a source operand to be compared against all sixteen entries using a single instruction. Such an instruction may be stored in control store 130 and executed by ALU 110. More particularly, control store 130 may store microcode including function calls that are executable by ALU 110. A group of function calls used to perform particular packet processing is a referred to as a microblock. The packet processing may include any type of processing, such as packet receiving, IPv6 forwarding, header compression, bridging, MPLS forwarding, and packet classification.

General-purpose registers 140 may be used to supply operands to the execution datapath of an instruction, and/or to store a result of an execution datapath. In one example to be described in more detail below, the results of a comparison between a value and the contents of CAM 120 may be stored in general-purpose registers 140. Processor 100 may include other registers such as transfer registers for transferring data to and from external locations.

Local memory 150 may comprise memory for storing 640 long words (32 bits) of data. Local memory 150 may be privately-addressable by processor 100 and may be used by its threads for temporary storage during execution of a microblock. According to some embodiments, local memory 150 stores a particular thread with another thread that follows the particular thread in an ordering queue. Structure and use of a next thread table according to some embodiments will be described below.

Each thread of processor 100 may be associated with its own register set, program counter and thread-specific local registers within processor 100. Such an arrangement may allow one thread to execute a computation while another thread of processor 100 waits for an I/O procedure (e.g. external memory access) to complete or for a signal from another thread or hardware element.

Each thread may be in one of four states: inactive, executing, ready, or sleep. A thread is inactive if it is not to be used by a particular microblock executed by processor 100. An executing thread is in control of processor 100, and the program counter of an executing thread fetches program code segments to be executed. A thread remains in the executing state until it executes code that causes it to enter the sleep state. According to some embodiments, only one thread of processor 100 may be in the executing state at a given time.

In the ready state, a thread is ready to execute code but does not because another thread is in the executing state. When the executing thread enters the sleep state, an arbiter selects a next thread to enter the executing state from all threads in the ready state. A thread in the sleep state is waiting for an external event to occur. As mentioned above, this event may include completion of an I/O procedure and a signal from a hardware element or another thread. A thread may enter the sleep state to wait for an event signal and may "wake" to the executing state in response to receipt of the event signal. An event signal may be received from hardware and/or from another thread.

Event signals may be used to ensure that critical code segments are properly executed. In this regard, eight threads of processor 100 may perform processing on a respective one of eight data packets. Each thread may execute identical microblocks to perform such processing, although the microblocks may be executed by different threads at different times. The executed microblocks may include one or more critical code segments. A thread executing a critical code segment may require exclusive access to a global resource such as a memory location. Accordingly, other threads may be prevented from accessing the resource while the thread executes the critical code segment.

Figure 3:
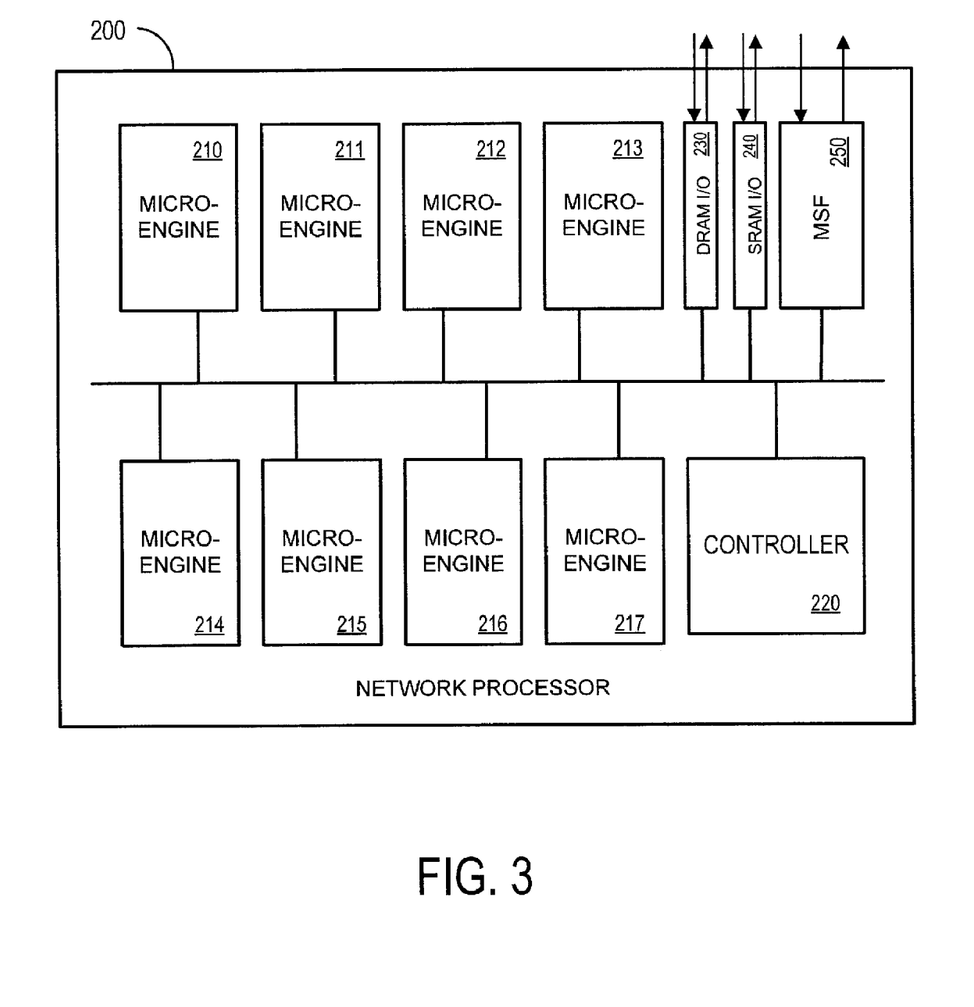
FIG. 3 is a block diagram of a network processor according to some embodiments.

FIG. 3 is a block diagram of network processor 200 that may be used in conjunction with some embodiments. Network processor 200 may comprise the IXP2400 processor and may therefore be an element of network device 300. Other network processors, such as an IXP2800™ Network Processor, may be used in some embodiments.

Network processor 200 includes microengines 210 through 217, each of which may include elements similar to those described with respect to processor 100. Accordingly, each of microengines 210 through 217 may comprise a multi-threaded processor for processing network packets. The above-mentioned IXP2800 Network Processor may comprise sixteen microengines.

Network processor 200 also includes Controller 220. Controller 220 may comprise, for example, a control plane processor (e.g., an Intel® XScale™ processor) that performs control and system management functions and executes real-time applications. DRAM I/O 230 may receive and transmit information including network packets from and to a remote DRAM, and SRAM I/O 240 may perform similar functions with respect to a remote SRAM.

Media and Switch Fabric (MSF) 250 couples processor 200 to a network physical (PHY) layer and/or a switch fabric. MSF 250 includes independent receive and transmit interfaces, as well as a receive buffer. The receive buffer stores incoming packets in the form sub-blocks known as elements. The receive buffer may store 8 KB of data, and the element size may be set to one of 64 B, 128 B or 256 B.

Network processor 200 may include elements other than those illustrated in FIG. 3. For example, network processor 200 may include elements for communicating with a host processor over a standard PCI interface. Network processor 200 may also or alternatively include a scratchpad memory for quickly passing data between microengines and/or threads.

Figure 4:
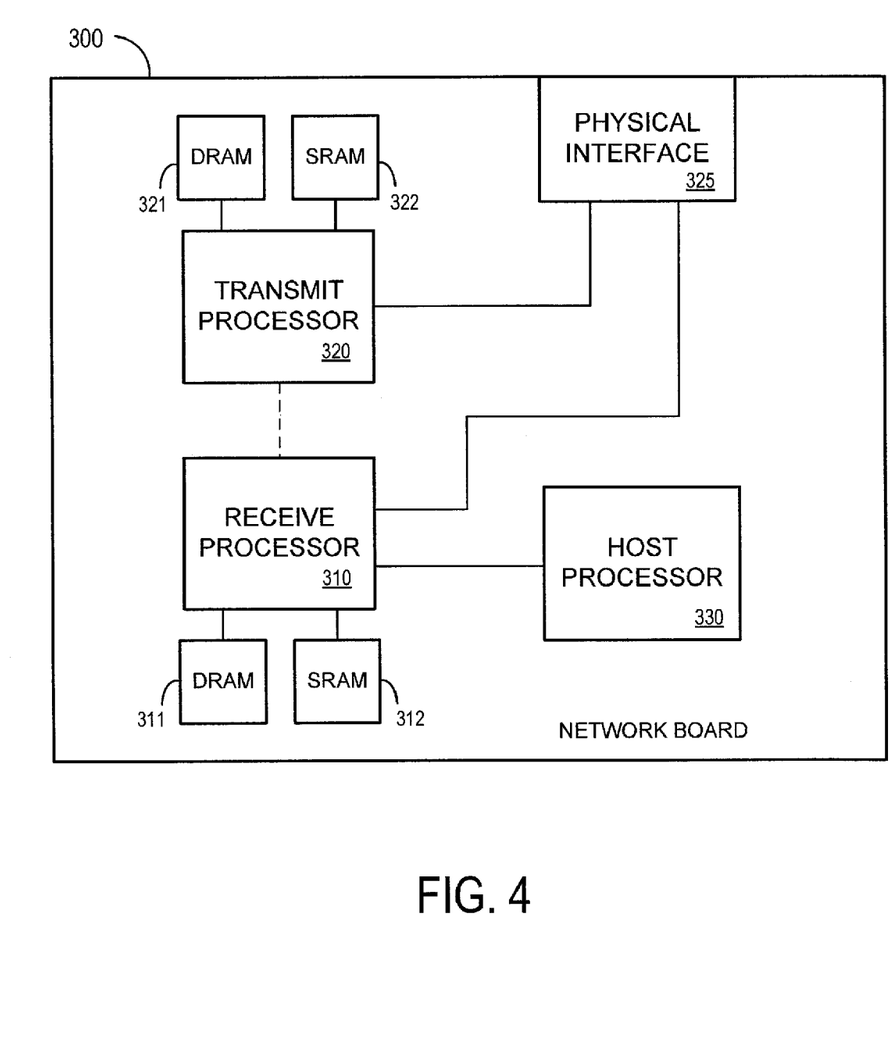
FIG. 4 is a block diagram of a network board according to some embodiments.

FIG. 4 is a block diagram of a network board according to some embodiments. Network board 300 may be an element of network device 30 of FIG. 1. Network board 300 includes transmit processor 310 and receive processor 320. One or both of transmit processor 310 and receive processor 320 may be implemented by network processor 200 of FIG. 3.

Receive processor 310 communicates with physical interface 325 via MSF 250 in order to receive network packets from a remote network device. Receive processor 310 may process the packets using DRAM 311 and SRAM 312. DRAM 311 and SRAM 312 may comprise any type of DRAM and SRAM, respectively, including Double Data Rate, Single Data Rate and Quad Data Rate memories. In some embodiments, the received network packets are stored in DRAM 311 during processing, while metadata associated with the packets is stored in SRAM 312. Similarly, transmit processor 320 may transmit network packets to a remote network device using physical interface 325, which is coupled to MSF 250 of processor 320. Prior to transmission, the packets may be processed using DRAM 321 and SRAM 322.

Host processor 330 is coupled to receive processor 310. Host processor 330 may control the general operation of network board 300.

Figure 5:
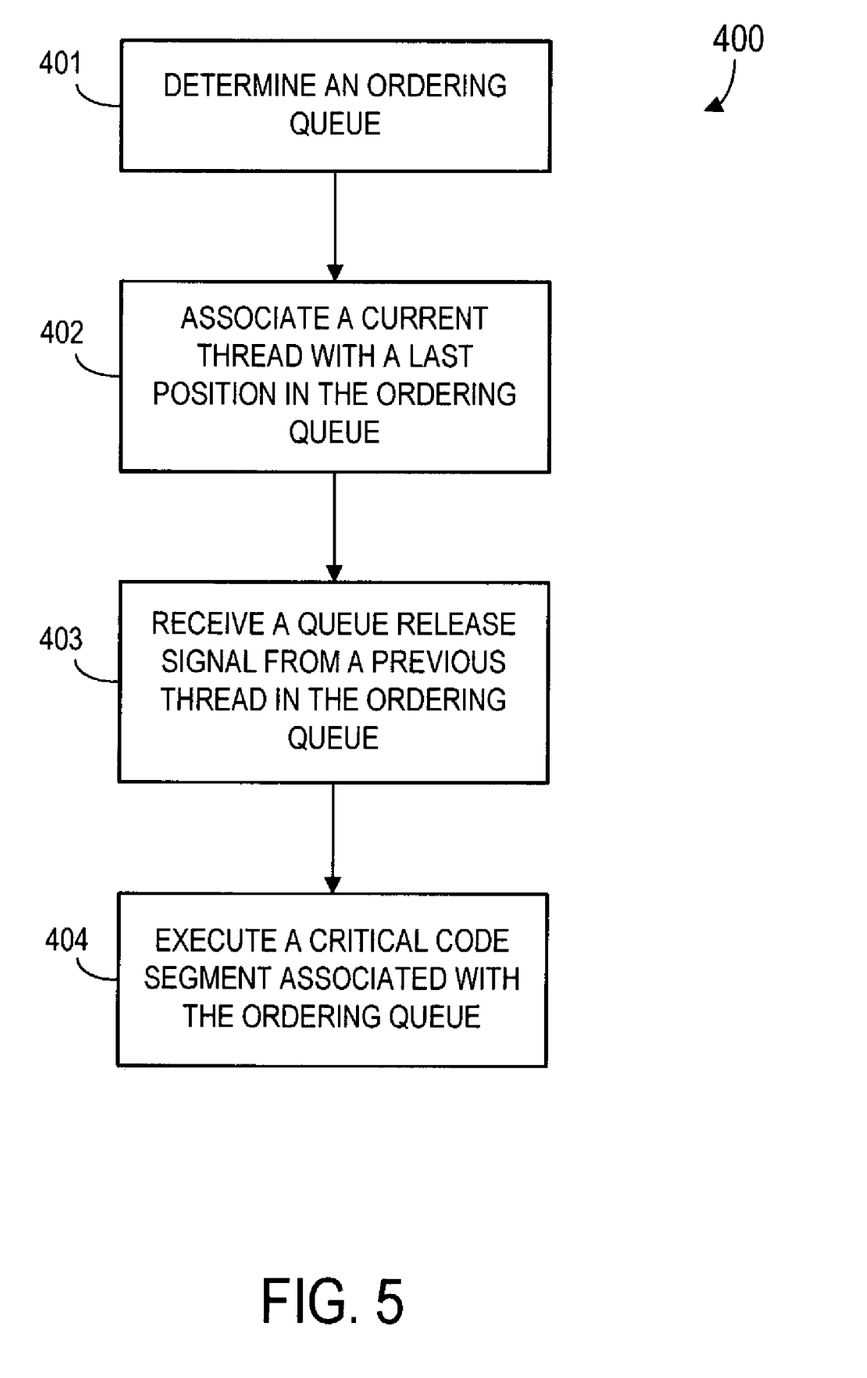
FIG. 5 is a flow diagram of a process according to some embodiments.

FIG. 5 is a flow diagram of process 400 that may be executed by network device 300 after receipt of a network packet. More particularly, process 400 may be executed by each of a plurality of threads of one or more of microengines 210 through 217 of network processor 200. Process 400 may be embodied in program code segments stored in a microengine control store. The program code may be received by a control store from any medium, such as a hard disk, an IC-based memory, a signal, or the like. In this regard, the program code may be included in a Software Developers' Kit associated with network processor 200.

A thread that is processing a packet initially determines an ordering queue in 401. An ordering queue may specify an order in which execution threads may execute a particular critical code segment that is associated with the ordering queue. The ordering queue may therefore be determined in 401 based on a code segment that the thread has been instructed to execute. The ordering queue may also be determined based on a characteristic of the packet that the thread is processing. For example, a particular packet characteristic of a first packet may differ from that of a second packet. Even though the first and the second packet are to be processed by a same critical code segment, a thread that is to process the first packet may determine a first ordering queue in 401 while a thread that is to process the second packet may determine a second, different, ordering queue in 401.

The current thread that is processing the packet associates itself with a last position of the determined ordering queue in 402. In some embodiments of 402, a value associated with the thread is related to a value associated with a last position in the ordering queue. According to a specific example, a data record may include a first field for specifying an ordering queue and a second field for specifying a thread that occupies a last position in the queue. A value associated with the determined ordering queue may be stored in the first field and a value associated with the current thread may be stored in the second field.

Next, in 403, the current thread receives a queue release signal from a previous thread in the ordering queue. This signal may be received using any of the inter-thread signaling mechanisms described above. The signal may indicate that the current thread may begin to process the packet using a critical code segment. Accordingly, the thread executes the critical code segment associated with the ordering queue in 404 in order to process the packet.

Figure 6:
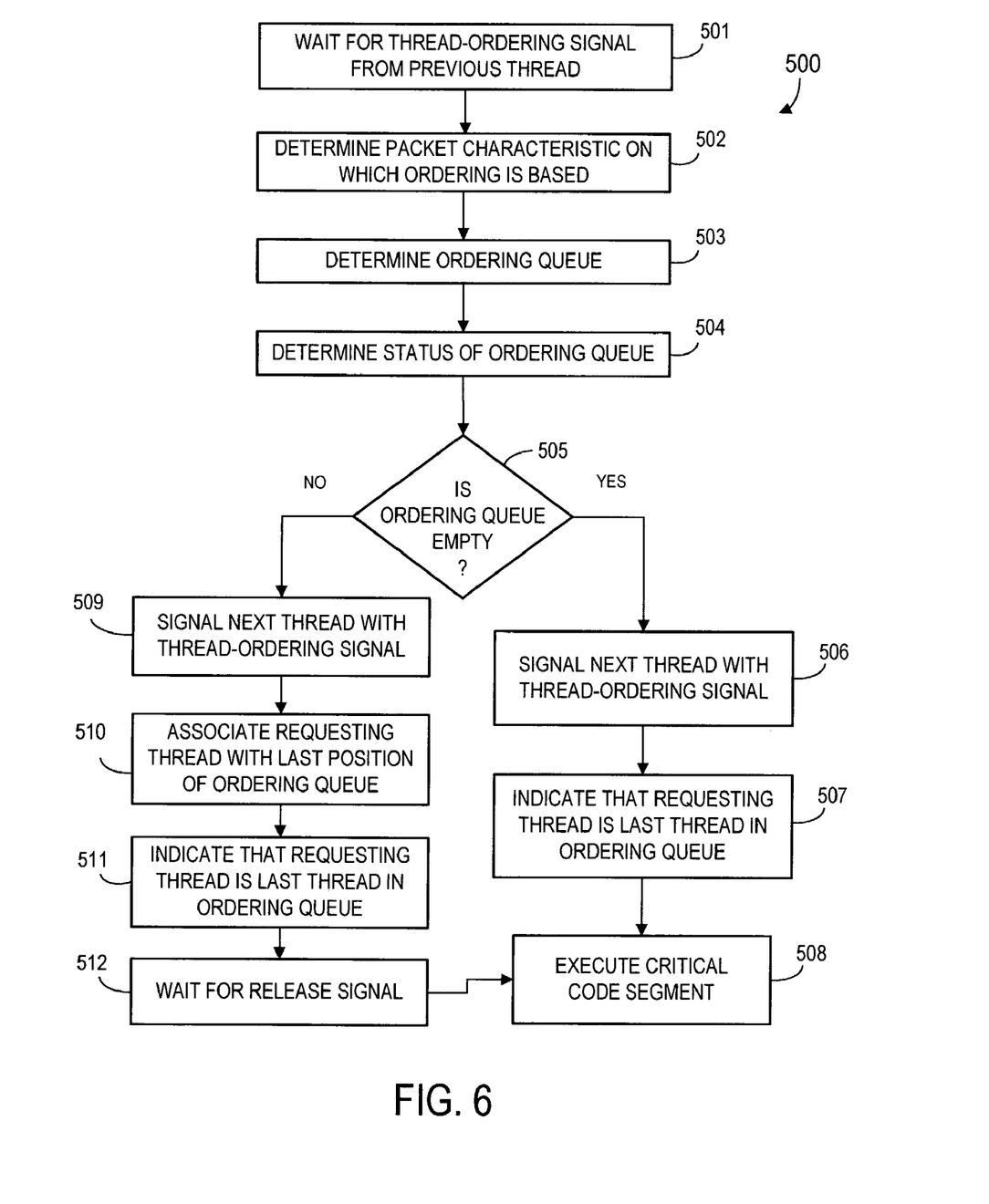
FIG. 6 is a flow diagram of a request process according to some embodiments.

FIG. 6 comprises a flow diagram of process 500, which roughly corresponds to one detailed embodiment of process 400. As such, process 500 may be executed by each of a plurality of threads of one of microengines 210 through 217 of network processor 200, and may be embodied in program code segments stored in an associated control store. The program code segments may also be received from any medium, including a hard disk, an IC-based memory, a signal, and a Software Developers' Kit. Process 500 may be executed by a thread prior to executing a critical code segment to process a received network packet. Process 500 may ensure that the thread executes the critical code segment exclusively and in an appropriate order with respect to the execution of the critical code segment by other threads to process other packets.

Initially, at 501, the thread is in a sleep state as it waits for a thread-ordering signal from a previous thread. The previous thread may occupy a position above the sleeping thread in a thread ordering list. The thread-ordering list may comprise a preferred order of thread execution. For example, a thread-ordering list may specify thread 0, thread 1, thread 2, . . . , thread 7. Therefore, thread 1 receives a thread-ordering signal from thread 0 and transmits a thread-ordering signal to threads 2 to ensure that the threads 0, 1 and 2 execute in the preferred order. The sleeping thread enters an active state to process its network packet after receiving the thread-ordering signal and proceeds to 502.

The thread determines a packet characteristic based on its network packet at 502. The packet characteristic may be a characteristic on which packet ordering is based. According to one example, the packet characteristic is the flow of the network packet. The flow of a packet may be based on a set of specific fields within the packet's header. All packets having identical data in each of the specific fields are determined to belong to a same flow. These fields may include the source, destination, source port, destination port, and protocol fields.

As an example of ordering based on packet flow, three received packets may be associated with a first flow and three received packets may be associated with a second flow. According to some embodiments, three threads successively and exclusively execute the critical code segment in order to process a first packet of the first flow before processing a second packet of the first flow and before processing a third packet of the first flow. Threads also execute the critical code segment with respect to the first, second and third packets of the second flow, but without regard to a time at which the packets of the first flow are processed using the critical code segment. Such an arrangement may be referred to as partial packet ordering.

An ordering queue is determined at 503. The ordering queue may be based on the packet characteristic and on the critical code segment for which exclusive and ordered execution is desired. According to some embodiments, a queue Id is determined in 503 based on the packet characteristic and the critical code segment. For example, a first 26 bits of the queue Id may identify the determined flow and a last 2 bits may identify the critical code segment.

Figure 7:
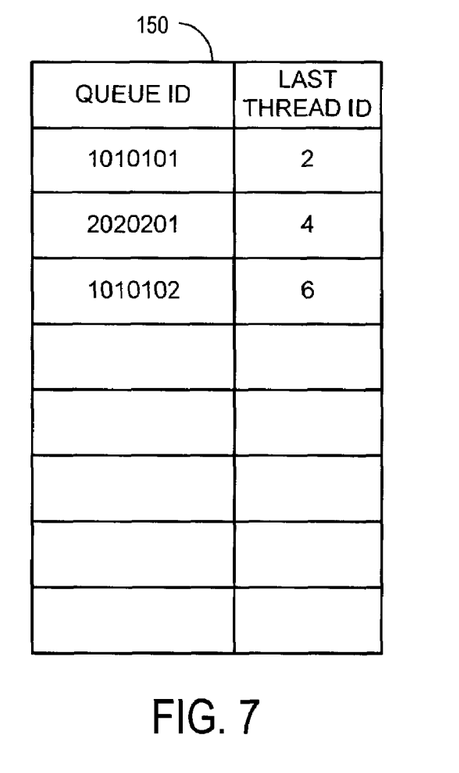
FIG. 7 is a tabular representation of a last thread table according to some embodiments.

FIG. 7 illustrates queue Ids as stored in a last thread table of CAM 150 according to some embodiments. The queue Ids comprise seven hexadecimal digits of 28 total bits that are defined as described above. Any queue Ids which include an identical first 26 bits are associated with a same flow, while any queue Ids which include an identical last 2 bits are associated with a same critical code segment. A queue Id is associated with a four-bit last thread Id that identifies a thread occupying a last position in an associated queue. Usage of the last thread table of CAM 150 according to some embodiments will be described below.

The current thread determines a status of the determined ordering queue in 504. The status may indicate whether the queue includes any threads or whether the queue is empty. According to the some embodiments, the thread queries CAM 150 with a queue Id of the determined queue. If an entry in CAM 150 matches the queue Id, CAM 150 stores a HIT flag, an entry location, and the last thread Id associated with the queue Id in registers 140. If no entry of CAM 150 matches the queue Id, CAM 150 stores a MISS flag and an available entry location in registers 140.

The thread may determine that the ordering queue is empty at 505. This determination may be based on a MISS flag stored by CAM 150 at 504. If so, the thread transmits a thread-ordering signal to a next thread in the thread-ordering list at 506. Next, in 507, the thread indicates that it is the last thread in the ordering queue. According to the present example, the thread stores an entry in 507 at the available entry location of CAM 150 that was stored in registers 140. The queue Id field of the entry includes a queue Id of the determined ordering queue and the last thread Id field includes an identifier of the current thread. The critical code segment associated with the ordering queue is then executed at 508. In one example, the critical code segment may be executed to perform header compression processing on the packet.

If the thread determines that the ordering queue is not empty at 505, the thread transmits a thread-ordering signal to a next thread in the thread-ordering list at 509. Moreover, the thread associates itself with a last position in the ordering queue at 510. In some embodiments of 510, the thread determines the entry location of CAM 150 that was stored in registers 140 along with the HIT flag. The thread then identifies the last thread Id specified at the entry location. Next, the thread locates a next thread table.

Figure 8:
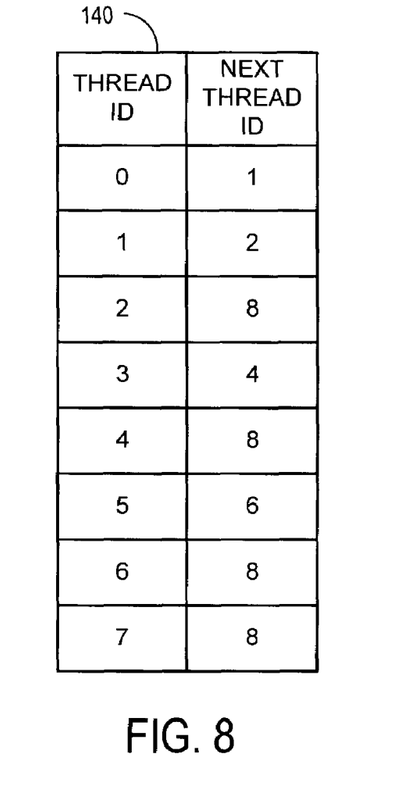
FIG. 8 is a tabular representation of a next thread table according to some embodiments.

FIG. 8 shows a next thread table as stored in local memory 140 according to some embodiments. A location of the next thread table may be a fixed global variable that is accessible by all execution threads. Each entry of the next thread table specifies a thread Id and a next thread Id. The thread specified in the next thread Id field follows the thread specified in the thread Id field within an ordering queue. Accordingly, to associate itself with a last position in the ordering queue, the current thread locates an entry that specifies the identified last thread Id in its thread Id field, and stores its own Id in the next thread Id field of the entry.

For example, it will be assumed that the queue Id of the ordering queue is "1010102" and that the thread Id of the current thread is "7". Therefore, at 510, a last thread Id of "6" is determined from the last thread table, and an entry of the next thread table is located which specifies "6" as its thread Id. Next, the current thread's Id ("7") is stored in the next thread Id field of the entry.

At 511, the current thread indicates that it is the last thread in the ordering queue. According to some embodiments of 511, the thread stores its own thread Id in the last thread Id field of the last thread table entry located in 510. Continuing with the above example, the thread Id "7" is stored in the last thread Id field of the entry associated with the queue Id "1010102".

Figure 9:
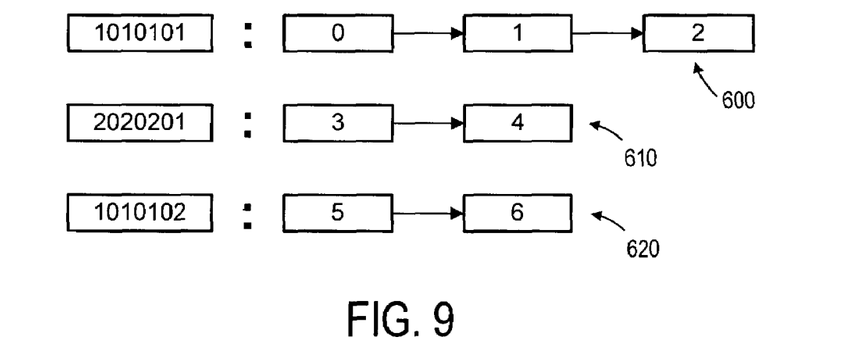
FIG. 9 is a representation of ordering queues according to some embodiments.

The current thread waits for a release signal in 512. The release signal, which will be described in greater detail below, is received from a previous thread of the ordering queue to which the current thread now belongs. Using the example of FIG. 8, thread "6" would receive a release signal from thread "5". In this regard, FIG. 9 illustrates ordering queues 600 through 610 that are based on the table values shown in FIG. 7 and FIG. 8. The current thread wakes after receiving the release signal in 512 and then executes the critical code segment in 508.

Figure 10:
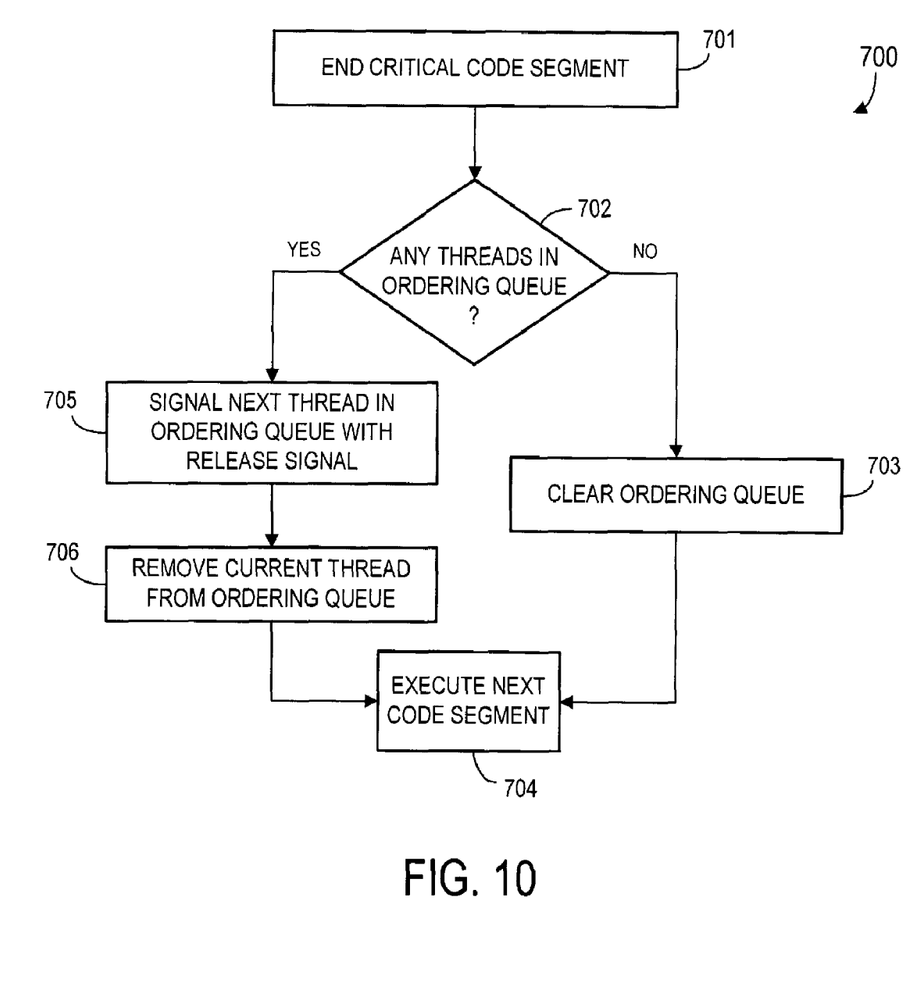
FIG. 10 is a flow diagram of a release process according to some embodiments.

FIG. 10 comprises a flow diagram of process 700 to be executed at the completion of the critical code segment. Process 700 may also be executed by each of a plurality of threads that process respective network packets. Process 700 may provide a system to allow a next thread in an ordering queue to exclusively execute the critical code segment.

The current thread completes execution of the critical code segment at 701. Next, at 702, the thread determines if the current ordering thread includes any other threads. The determination is made in some embodiments by examining an entry of the next thread table of local memory 140 that specifies the current thread in its thread Id field. If the next thread Id field of the entry is empty or includes an invalid value, it is determined that the ordering queue does not include any other threads. Using FIG. 8 as an example, the current thread determines that the queue is empty if the thread Id of the current thread is "6" because the associated next thread Id ("8") is an invalid value in a system that includes eight threads having Ids of 0 through 7.

If the ordering queue does not include any other threads, then the current thread is a last thread in the ordering queue. The thread may then clear the ordering queue at 703 by deleting the entry of the last thread table that corresponds to the ordering queue. Accordingly, a next thread that executes process 500 may determine that the ordering queue is empty. The thread then executes a next code segment at 704.

Returning to 702, the thread determines that the ordering queue includes additional threads if the next thread table includes a valid thread Id within the next thread Id field that is associated with the current thread Id. Therefore, at 705, a release signal is transmitted to a thread associated with the valid thread Id. Again with reference to FIGS. 7 and 8, thread 0 transmits a release signal to thread 1 at 704 because thread 1 is a next thread in the ordering queue associated with queue Id "1010101". The next thread may receive the release signal during stage 512 of process 500. Accordingly, the next thread may execute the critical code segment once it becomes active.

The current thread removes itself from the ordering queue at 705. In some embodiments of 705, the current thread clears or stores an invalid value in the next thread Id field associated with its own thread Id. Assuming that the current thread is thread 0, the current thread may locate the next thread table entry that is associated with the thread Id "0", and may clear the next thread Id field of the located entry. The current thread then proceeds to execute a next code segment in 704 as described above.

Although the foregoing embodiments have been described with respect to threads provided by a single microengine, some embodiments may allow threads of multiple microengines to belong to a single ordering queue. In some of such embodiments, the threads of the multiple microengines may access one or more shared memories that include data such as the data illustrated in FIGS. 7 and 8.

The several embodiments described herein are solely for the purpose of illustration. Embodiments may include any currently or hereafter-known versions of the elements described herein. Therefore, persons in the art will recognize from this description that other embodiments may be practiced with various modifications and alterations.

What is claimed is:

1. A method comprising:
   determining an ordering queue;
   associating a current thread with a last position in the ordering queue;
   receiving a queue release signal from a previous thread in the ordering queue;
   executing a critical code segment associated with the ordering queue;
   receiving a thread-ordering signal from a previous thread; and
   transmitting the thread-ordering signal to a next thread before receiving the queue release signal.

2. A method according to claim 1, further comprising:
   receiving a network packet;
   determining a packet characteristic based on the network packet; and
   determining the ordering queue based on the packet characteristic.

3. A method according to claim 2, wherein the packet characteristic is a packet flow of the network packet.

4. A method comprising:
   determining an ordering queue;
   associating a current thread with a last position in the ordering queue;
   receiving a queue release signal from a previous thread in the ordering queue;
   executing a critical code segment associated with the ordering queue;
   querying a content-addressable memory for an entry associated with the ordering queue; and
   receiving an indication that the entry associated with the ordering queue is stored in the content-addressable memory and an indication of a last thread in the ordering queue.

5. A method according to claim 4, wherein associating the current thread with the last position in the ordering queue comprises:
   identifying a record stored in a local memory, the record associated with the last thread in the ordering queue; and
   associating an indication of the current thread with the record.

6. A method comprising:
   determining an ordering queue;
   associating a current thread with a last position in the ordering queue;
   receiving a queue release signal from a previous thread in the ordering queue;
   executing a critical code segment associated with the ordering queue;
   querying a content-addressable memory for an entry associated with the ordering queue;
   receiving an indication that no entry associated with the ordering queue is stored in the content-addressable memory; and storing an entry associated with the ordering queue in the content-addressable memory, the entry including an indication that a current thread is a last thread in the ordering queue.

7. A method according to claim 1, further comprising:
determining that the current thread is associated with the last position in the ordering queue; and
clearing the ordering queue.

8. A method according to claim 1, further comprising:
determining the next thread; and
transmitting a release signal to the next thread.

9. A method according to claim 8, wherein determining the next thread comprises determining a next thread in the ordering queue, the method further comprising:
removing the next thread from the ordering queue.

10. An article of manufacture storing program code, the program code executable to:
determine an ordering queue;
associate a current thread with a last position in the ordering queue;
receive a queue release signal from a previous thread in the ordering queue;
execute a critical code segment associated with the ordering queue;
receive a thread-ordering signal from a previous thread; and
transmit the thread-ordering signal to a next thread before receiving the queue release signal.

11. An article according to claim 10, the program code executable to:
receive a network packet;
determine a packet characteristic based on the network packet; and
determine the ordering queue based on the packet characteristic.

12. An article according to claim 11, wherein the packet characteristic is a packet flow of the network packet.

13. An article of manufacture storing program code, the program code executable to:
determine an ordering queue;
associate a current thread with a last position in the ordering queue;
receive a queue release signal from a previous thread in the ordering queue;
execute a critical code segment associated with the ordering queue;
query a content-addressable memory for an entry associated with the ordering queue; and
receive an indication that the entry associated with the ordering queue is stored in the content-addressable memory and an indication of a last thread in the ordering queue.

14. An article according to claim 13, wherein associating the current thread with the last position in the ordering queue comprises:
identifying a record stored in a local memory, the record associated with the last thread in the ordering queue; and
associating an indication of the current thread with the record.

15. An article of manufacture storing program code, the program code executable to:
determine an ordering queue;
associate a current thread with a last position in the ordering queue;
receive a queue release signal from a previous thread in the ordering queue;
execute a critical code segment associated with the ordering queue;
query a content-addressable memory for an entry associated with the ordering queue;
receive an indication that no entry associated with the ordering queue is stored in the content-addressable memory; and
store an entry associated with the ordering queue in the content-addressable memory, the entry including an indication that a current thread is a last thread in the ordering queue.

16. An article according to claim 10, the program code executable to:
determine that the current thread is associated with the last position in the ordering queue; and
clear the ordering queue.

17. An article according to claim 10, the program code executable to:
determine the next thread; and
transmit a release signal to the next thread.

18. An article according to claim 17, wherein the program code executable to determine the next thread comprises program code executable to determine a next thread in the ordering queue, the program code executable to:
remove the next thread from the ordering queue.

19. An apparatus comprising:
a processor to provide a plurality of execution threads;
a local memory associated with the processor; and
a content-addressable memory associated with the processor,
an execution thread of the processor to:
determine an ordering queue;
associate a current thread with a last position in the ordering queue;
receive a queue release signal from a previous thread in the ordering queue;
execute a critical code segment associated with the ordering queue;
receive a thread-ordering signal from a previous thread; and
transmit the thread-ordering signal to a next thread before receiving the queue release signal.

20. An apparatus according to claim 19, the execution thread of the processor to:
receive a network packet;
determine a packet flow based on the network packet; and
determine the ordering queue based on the packet flow.

21. An apparatus comprising:
a processor to provide a plurality of execution threads;
a local memory associated with the processor; and
a content-addressable memory associated with the processor,
an execution thread of the processor to:
determine an ordering queue;
associate a current thread with a last position in the ordering queue;
receive a queue release signal from a previous thread in the ordering queue;
execute a critical code segment associated with the ordering queue;
query the content-addressable memory for an entry associated with the ordering queue; and
receive an indication that the entry associated with the ordering queue is stored in the content-addressable memory and an indication of a last thread in the ordering queue, wherein associating the current thread with the last position in the ordering queue comprises:

identifying a record stored in the local memory, the record associated with the last thread in the ordering queue; and associating an indication of the current thread with the record.

22. An apparatus according to claim 19, the execution thread of the processor to:

determine the next thread; and transmit a release signal to the next thread.

23. A system comprising:

a processor to provide a plurality of execution threads;

a local memory coupled to the processor;

a content-addressable memory coupled to the processor; and a double data rate dynamic random access memory in communication with the processor, an execution thread of the processor to:

determine an ordering queue for processing a packet stored in the memory;

associate a current thread with a last position in the ordering queue;

receive a queue release signal from a previous thread in the ordering queue;

execute a critical code segment associated with the ordering queue;

query the content-addressable memory for an entry associated with the ordering queue; and receive an indication that the entry associated with the ordering queue is stored in the content-addressable memory and an indication of a last thread in the ordering queue.

24. A system according to claim 23, wherein associating the current thread with the last position in the ordering queue comprises:

identifying a record stored in the local memory, the record associated with the last thread in the ordering queue; and associating an indication of the current thread with the record.

25. A system according to claim 23, wherein the processor comprises a network processor having a plurality of packet engines.

* * * * *